United States Patent
Lecourtier

(10) Patent No.: US 9,575,850 B2
(45) Date of Patent: Feb. 21, 2017

(54) METHOD AND DEVICE FOR SYNCHRONOUSLY RUNNING AN APPLICATION IN A HIGH AVAILABILITY ENVIRONMENT

(71) Applicant: BULL SAS, Les Clayes Sous Bois (FR)

(72) Inventor: Georges Lecourtier, Versailles (FR)

(73) Assignee: BULL SAS, Les Clayes Sous Bois (FR)

( * ) Notice: Subject to any disclaimer, the term of this patent is extended or adjusted under 35 U.S.C. 154(b) by 17 days.

(21) Appl. No.: 14/788,867

(22) Filed: Jul. 1, 2015

(65) Prior Publication Data
US 2016/0004608 A1    Jan. 7, 2016

(30) Foreign Application Priority Data

Jul. 1, 2014   (FR) ..................................... 14 56274

(51) Int. Cl.
| G06F 11/00 | (2006.01) |
|---|---|
| G06F 11/14 | (2006.01) |
| G06F 9/48 | (2006.01) |
| G06F 11/16 | (2006.01) |
| G06F 11/20 | (2006.01) |

(52) U.S. Cl.
CPC ......... G06F 11/1474 (2013.01); G06F 9/4887 (2013.01); G06F 11/1691 (2013.01); G06F 11/2028 (2013.01); G06F 2201/87 (2013.01)

(58) Field of Classification Search
CPC .............. G06F 11/1474; G06F 2201/87; G06F 11/1691; G06F 11/2028; G06F 9/4487
USPC .......................................................... 714/37
See application file for complete search history.

(56) References Cited

U.S. PATENT DOCUMENTS

| 4,321,666 A * | 3/1982 | Tasar | ...................... G06F 11/00 714/10 |
|---|---|---|---|
| 5,488,716 A * | 1/1996 | Schneider | ........... G06F 11/1691 714/10 |
| 8,826,077 B2 * | 9/2014 | Bobak | ................. G06F 11/0709 714/26 |

(Continued)

FOREIGN PATENT DOCUMENTS

| EP | 2 709 010 A1 | 3/2014 |
|---|---|---|
| WO | WO 93/09494 | 5/1993 |

OTHER PUBLICATIONS

Preliminary Search Report as issued in French Patent Application No. 1456274, dated Mar. 12, 2015.

(Continued)

*Primary Examiner* — Yair Leibovich
(74) *Attorney, Agent, or Firm* — Pillsbury Winthrop Shaw Pittman LLP

(57) ABSTRACT

A method for synchronously running an application in a high availability environment including a plurality of calculating modules interconnected by a very high-speed broad band network, includes: configuring the modules into partitions including a primary and a secondary partition and a monitoring partition; running the application on each running partition, inputs-outputs processed by the primary partition transmitted to the secondary running partition via the monitoring partition; synchronizing the runnings via exploiting microprocessor context changes; transmitting a catastrophic error signal to the monitoring partition; continuing the running by switching to a degraded mode, the running continuing on a single partition.

17 Claims, 3 Drawing Sheets

(56) References Cited

U.S. PATENT DOCUMENTS

2011/0214014 A1* 9/2011 Bertacco ............ G06F 11/2236
                                                                   714/15
2014/0082331 A1* 3/2014 Smith, II ............ G06F 9/4887
                                                                   712/220

OTHER PUBLICATIONS

Kriegel, M., "Bounding Error Detection Latencies for Replicated Execution," Bachelor Thesis, Jun. 27, 2013, pp. 1-66.

* cited by examiner

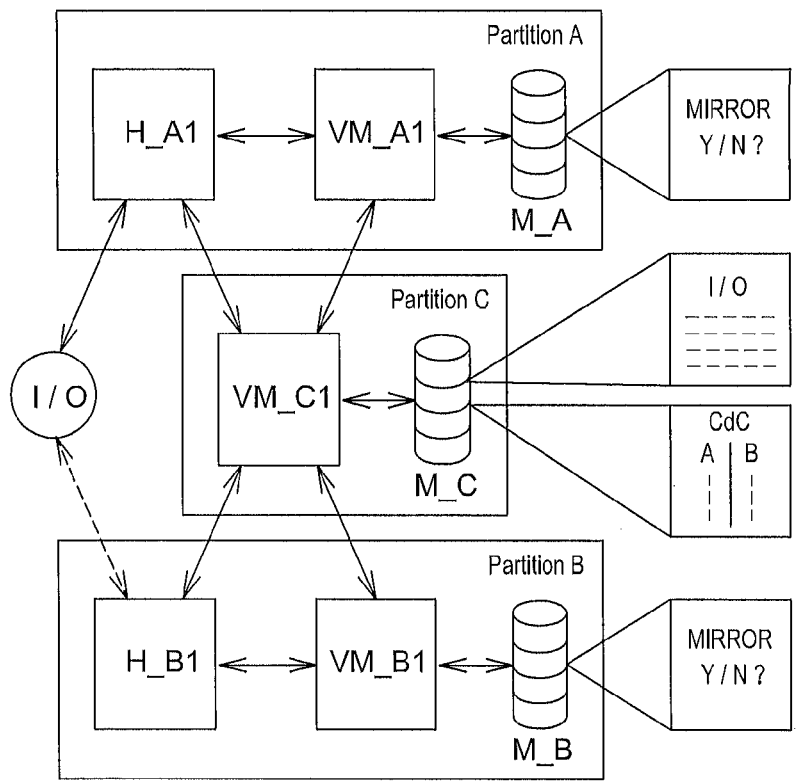
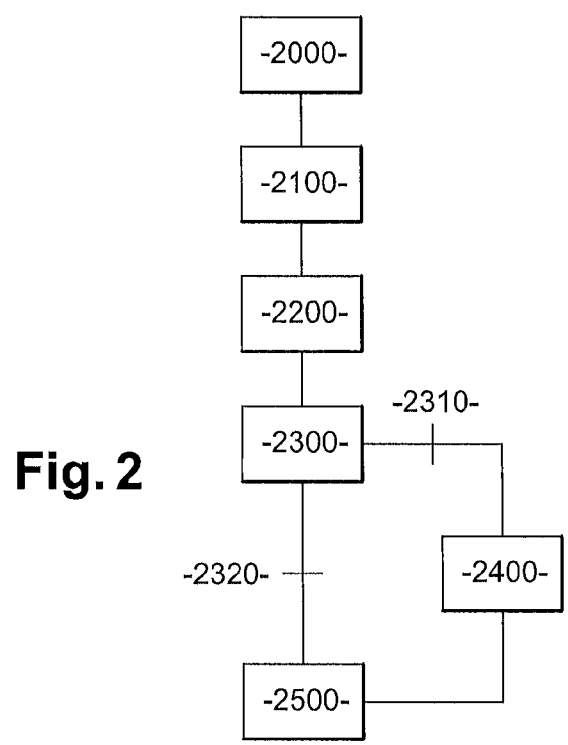
Fig. 1
Fig. 2

METHOD AND DEVICE FOR SYNCHRONOUSLY RUNNING AN APPLICATION IN A HIGH AVAILABILITY ENVIRONMENT

CROSS-REFERENCE TO RELATED APPLICATIONS

This application claims priority to French Patent Application No. 1456274, filed Jul. 1, 2014, the entire content of which is incorporated herein by reference in its entirety.

FIELD

The present invention is directed to a method and a device for synchronously running an application in a high availability environment. The present invention relates to improving the environment resilience. The resilience is defined as the ability of a system to survive a number of failures and to allow it to be repaired without causing a service interruption.

The field of the invention is generally that of information processing or communication systems, and more particularly that of computer production systems using high availability servers.

BACKGROUND

Known computer systems are all subjected to hardware- or software-based failures which affect their general operation at random instants. When one of these systems manages critical functions as regards life and property safety, the behaviour of the electronic system in the presence of a failure becomes a deciding factor of the overall reliability perceived by the users. This behaviour will define the resilience class of the system. It is fully dependant on technical choices made while designing the system because it is based on redundancies at the hardware level which always imply some cost. The resilience class is therefore the result of a trade-off between cost minimization and availability maximization.

Several types of solutions have been developed to best meet resilience requirements in terms of hardware. Four classes of hardware component failures and three classes of for software component failures can be taken as significant examples of events affecting the operation of a computer.

The four classes of hardware components examined are memories, input-output circuits, power supplies and cooling components, and processors.

Memories

Memories are among components the raw reliability of which is the poorest because of the very high miniaturization of the memory elements which thus become very sensitive to manufacturing defects and disturbances of various origins affecting their environment. Quite fortunately, these problems have been investigated for a long time and plenty of measurements, as for example error-correcting codes, aim at enabling the memories to offer an acceptable operational reliability.

Inputs-Outputs

Input-output failures are characterized by one or more errors detected in a protocol or in a packet of data being exchanged between two systems. The vast majority of these errors are based on the electromagnetic environment of transmission (noises, etc.) and the problem is solved by a retry of the input-output transaction. In the cases where the link is physically interrupted by a circuit hardware failure (cable, connector, laser, etc.), the resilience is usually fed by an input-output redundancy channel which offers an alternative passage to the data, irrespective of whether this passage is direct between both systems or relayed through a computer network.

Power Supplies and Cooling Components

In a high availability system, the power grid supplies and fans or hydraulic pumps are always redundant. Thus, a failure of any of these components does not affect user applications. The repair is made by a hot swap of the power supply or cooling device.

On the other hand, power supplies having the lowest level, also called POL "Point Of Load", which directly provide power to the processors, memories, or input-output circuits, are not generally redundant and are welded to the motherboard for cost, overall space and performance reasons. The hang-up of these types of components is thus fatal for functional components directly attached thereto. POL failures are thus assimilated to failures of functional components.

Processors

Processors are in a separate class because their failures have multiple origins and require to be explained.

Since the processors of these critical systems generally support a multi-core architecture, this hypothesis will be assumed.

To ensure resilience of the processors, once again the hardware redundancy is used. Here, the hardware is the direct support for running system software and applications. Duplicating an application processor causes the need for synchronizing the foreground processor, which interacts with users, and the background processor(s) which will replace, on the fly, the foreground processor at the moment where it experiences a failure.

In the prior art, and for simple enough processors, a solution was to triple, on a same board or on a same integrated circuit, the calculation functions and to add a circuit for comparing the results based on the states of the input-output common buses and memory. The width of these buses could reach 128 data bits and 32 addressing bits. To the scale of each machine cycle, typically between 1 and 10 ns, the comparing circuit delivered a coherence status based on a majority vote principle: the proper state is the one which is present in at least two of the three processors. As soon as an error was detected in the foreground processor, or that the comparing circuit indicated that the bus of this processor was different from that of both other buses, the foreground processor was hung-up and the running continued on the first background processor. Possible failures of the background processors were deferred and caused a passage into degraded mode, waiting for the processor board swap. Since swapping this board implied a service hang-up, the application had to be moved before onto an equivalent back-up system which, in principle, should not have any hardware element in common with the primary system. The duration of this recovery could dramatically affect the service availability if the volume of the information to be moved was significant. If this constraint was desired to be dispensed with, three distinct processor boards had to be provided in the same cabinet or the same frame, but unfortunately, the circuit for comparing the results very quickly caused a performance limitation because of the restricted propagation rate of the electrical or optical signals. Thereby, this mode is both expensive and poorly efficient, above all if the implementation of standard multi-core sockets which do not incorporate the functions of comparing buses states outside the socket is contemplated.

Thus, in prior art, the solutions to the high availability problem do not cover the failures of the processors themselves without significant performance degradation.

The three classes of software components on which the reliability problems are based are the critical sections of the hypervisors and the operating systems, the defects of the input-output drivers and of the firmware onboard the hardware, and the defects of the applications.

Critical Sections

A critical resource is a set of runnable data or instructions protected by a software lockout. A critical section is the series of instructions to which a running core resorts to use a critical resource. It is well known that the software lockout which protects from the simultaneous running of a same critical section by more than one core uses a "Test-And-Set"-type special instruction implementing a specific hardware device in processors and controllers of the cache memory. At the output of a critical section, the process operating on the running core in question has to release the critical resource by replacing the software lockout in a so-called open state.

It is common in multitask programs operating on symmetrical multiprocessor-type systems, also called SMP "Symmetric Multiprocessing", having several cores and sharing the same memory, to create deadlocks, because of an erroneous management of the critical resources. Fortunately, the operating systems are widely free of these deadlocks thanks to intensive tests but user applications are often affected by such problems. Thereby, the operating systems should be capable of releasing the resources blocked by a user deadlock by pre-empting the core and suspending running of the failing process. However, if a hypervisor creates such a deadlock on its own, no software process will be able to deblock it and such a defect is similar to a hardware failure that can affect user data.

Input-Output Drivers and Firmware

Input-output drivers and firmware are characterized by their close contact with the hardware and their high optimization level towards real time performance. Each evolution of the hardware can require an update of this software if it is not onboard in solid state in electronic boards, but as the defect situations only occur under very rare conditions, it is common to run a firmware or driver in an obsolete version.

Application Defects

Applications managed by an operating system, OS, are subjected to the procedures of this OS and are generally killed if they are end up in deadlock using 100% of the power of a processor core. The other defects, which do not block a critical resource of the system, correspond to logic errors of the application affecting the accuracy of the results and do not relate to the present invention.

If a hypervisor is present in the system, it acts as a "super-OS" and the OS(s) operating under this hypervisor, called guest OS, are isolated from the hardware and also from each other. In this case, it can be said that a guest OS is similar to a sub-OS application. In particular, the hypervisor is capable of "killing" (indeed a process is said to be killed), resetting, or moving a full OS with its application programs from a system to another through network resources. The movement time, also called migration, depends, of course, on the bandwidth of this network.

For the sake of clarity of this disclosure, the software-based failures will not be extensively discussed, even though they can be a major failure cause. The repair of these software failures is based on installing new software or firmware versions. Normally, if the system has been well designed, these installations can be remotely made, without physical intervention on the hardware. The rare case where a software failure implies a direct access is that of a defect in the bootstrap firmware, that is in the code which is used to update the other software or firmware. It is generally processed by a double code version: the so-called plant version and the so-called user version. The only version which follows the maintenance evolutions is the user version. The plant version is write protected and thus enables the system configuration to be regenerated at any time. Thereby, these will remain the failures of the bootstrap memory itself, which are part of the cases dealt with in the analysis that follows.

SUMMARY

An aspect of the invention is in particular to solve the problems just set forth. Indeed, an aspect of the invention aims at minimizing the unavailability time of the servers.

To that end, an aspect of the invention provides a method for synchronously running an application in a high availability environment including a plurality of calculating modules interconnected by a very high-speed broad band network, the method including:
  configuring the plurality of modules into a plurality of partitions including at least:
    two running partitions including nodes identical in number and in characteristics, a primary running partition and a secondary running partition;
    a monitoring partition including at least one module;
  running the application on each running partition, inputs-outputs processed by the primary partition being transmitted to the secondary running partition via the monitoring partition which logs these inputs-outputs as transactions distributed between the primary running partition and the secondary running partition,
  synchronizing the runnings on the primary partition and on the secondary partition by numbering microprocessor context changes, a time deviation corresponding to the difference between the current context numbers, on the primary and secondary running partitions, having to be lower than a given value;
  transmitting a catastrophic error signal to the monitoring partition, said signal being characteristic of a failure in a module of a running partition;
  continuing the running by switching to a so-called degraded mode, the running continuing on a single partition, and in the case of a failure of a module of the primary running partition, performing a changeover operation, the secondary running partition becoming the new primary running partition.

The method according to an embodiment of the invention can include, in addition to the primary steps just mentioned in the preceding paragraph, one or more further characteristics from the following ones:

an interruption is forced at a predetermined frequency, to force a microprocessor context change and thus perform a synchronization;

the predetermined frequency is in the order of 20 Hz, the desynchronization being thus bounded at 50 ms;

the application is virtualized via a hypervisor;

the virtual machines are identical on the primary running partition and on the secondary running partition, the virtual machines being run on a single processor core;

the step of configuring the plurality of modules into a plurality of partitions is dynamically performed, without service hang-up of the environment;

the apparent unavailability of the environment is equal to the desynchronization between the running of the application on the primary and secondary partitions, the unavailability being thus bounded by the synchronization of the runnings.

Further, an embodiment of the invention provides a digital storage device including a file corresponding to instruction codes implementing the method according to an embodiment of the invention.

An embodiment of the invention also provides a device implementing the method according to an embodiment of the invention.

An aspect of the invention also provides a device implementing the method according to an embodiment of the invention and including a possible combination of the following characteristics:

the device includes a plurality of modules inserted in a frame wherein a bottom plate of a module includes insertion guides attached to the bottom plate, these guides being of two types:

a first type, to ensure a final guiding and protection of a connector of the bottom plate, a second type having a cone-ended cylindrical shape to ensure an initial guiding, each guide having a corresponding means in the frame;

the first type has a cone-ended cylindrical shape, its length being lower than that of the second type in the order of one centimeter;

the first type is a recessed part able to cooperate with a cone-ended cylindrical shape;

at least one guide of the second type is rigidly attached to the bottom plate;

at least one guide of the first type is loosely attached to the bottom plate;

at least one cylindrical guide cooperating with the guide of the first type is loosely attached to the frame;

the bottom plate includes four guides of the first type and two guides of the second type;

the guides are symmetrically distributed with respect to axes of symmetry of the bottom plate.

The invention and its different applications will be better understood upon reading the description that follows and upon examining the accompanying figures.

BRIEF DESCRIPTION OF THE FIGURES

They are only presented by way of indicating and in no way limiting purposes of the invention. The figures show:

in FIG. 1, a logic architecture enabling the method according to an embodiment of the invention to be implemented;

in FIG. 2, a representation of different steps of the method according to an embodiment of the invention;

DETAILED DESCRIPTION

Figure 3:
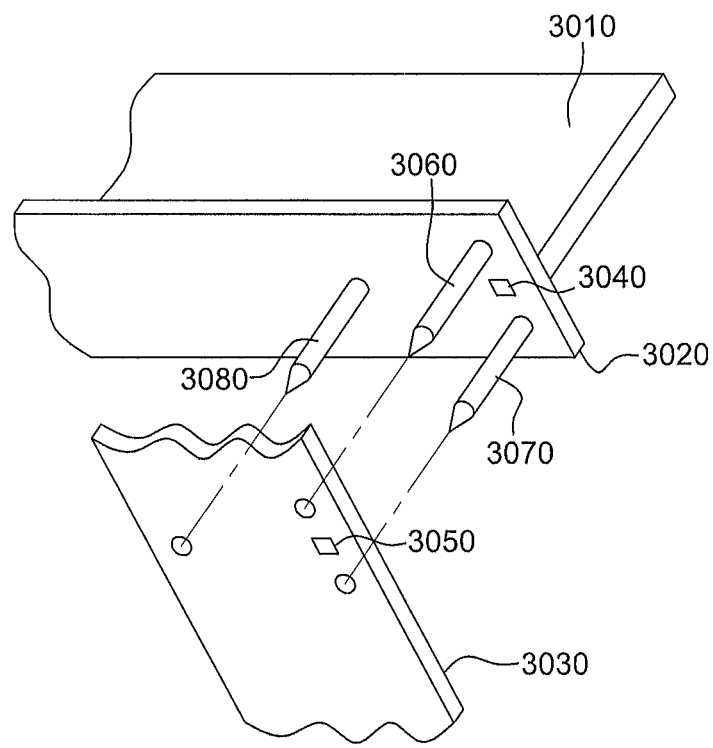
in FIG. 3, an illustration of an element of a device implementing an embodiment of the invention.

FIG. 1 shows an exemplary logic architecture enabling the method according to an embodiment of the invention to be implemented. A mode of hardwaring this virtual architecture on a known hardware architecture will be described later.

FIG. 1 shows two identical partitions, a first partition A and a second partition B, each including a hypervisor H and a virtual machine VM.

A hypervisor, also called a virtualization engine, is a set of instruction codes which emulates, for a virtual machine, a hardware architecture. Among the most known, KVM, HyperV, and CMWare can be mentioned.

A virtual machine, called VM, is mainly comprised of a configuration file which describes resources (microprocessor, disc, input-output peripherals, etc.) which have to be virtualized by a hypervisor.

Further, each of the partitions A and B includes a storage device (or storage medium) M where instruction codes corresponding to a hypervisor according to an embodiment of the invention and files corresponding to virtual machines (configuration, status, in particular the state of the processor, virtual disc, etc.) are recorded.

FIG. 1 shows input-output peripherals I/O connected to the first partition A via the hypervisor H_A1 of the first partition A. The partitions A and B are identical, hence FIG. 1 shows that the input-output peripherals I/O can be connected to the second partition B via the hypervisor H_B1 of the second partition. This possibility is a potential connection which is established under some circumstances explained later.

One of these two virtual machines of the running partitions is defined, for example in the configuration file, as a mirror of the other. In the example, it is the secondary partition which is considered as a mirror.

FIG. 1 also shows a third partition C including a virtual machine VM_C1 and storage device M_C. The virtual machine VM_C1 of the third partition C logs in a file the inputs-outputs of the first partition A and transmits them to the second partition B. Furthermore, the virtual machine VM_C1 of the third partition tracks with numbers context changes (FIG. 1 CdC) of the hypervisor H_A1 of the first partition A and of the hypervisor H_B1 of the second partition in order to synchronize virtual machines.

In an embodiment according to the invention, before starting the virtual machines, the virtual machine of the second partition is obtained by copying the virtual machine of the first partition, which guarantees virtual machines synchronized at start.

When an action is allocated to a hardware or virtual device, this action is in fact performed by a microprocessor of the device controlled by instruction codes recorded in a memory of the device. If an action is allocated to an application, this action is in fact performed by a microprocessor of the device in a memory in which the instruction codes corresponding to the application are recorded.

FIG. 2 shows steps of the method according to an embodiment of the invention. In particular, FIG. 2 shows a step 2000 of configuring a plurality of modules into a plurality of partitions including at least:

two running partitions including nodes identical in number and in characteristics, a primary running partition and a secondary running partition; in the example, the primary running partition is the first partition A, the secondary running partition is the second partition B;

a monitoring partition including at least one module; in the example the monitoring partition is the third partition C.

In an embodiment, on each running partition, a hypervisor and a virtual machine are installed, on which machine the application to be run is installed.

During a step 2100, following the configuring step 2000, a same application is run on the primary running partition A and on the secondary running partition B. This is a running step. Inputs-outputs processed by the primary running partition A are transmitted to the secondary running partition B via the monitoring partition C which logs these inputs-outputs as transactions distributed between the primary running partition A and the secondary running partition B.

The transaction is referred to as distributed because it is only validated if the operations have been properly ended on both partitions A and B.

A synchronizing step 2200 ensures a synchronization of the runnings between the primary partition A and the secondary partition B by means of numbering the microprocessor context changes performed by the monitoring partition C. A time offset, corresponding to the difference between the current context numbers on the primary A and secondary B running partitions, should be kept lower than a predetermined value, for example 50 ms. In one alternative, this deviation is assessed for example by the difference between context change numbers. In this case, this is not really a time difference but a difference between numbers belonging to two sequences representing the same series of events, an event being here a context change. The term "runnings" is equivalent to "executions" and those terms are used herein interchangeably.

The running and synchronizing steps are run in parallel, that is simultaneously.

At each context change, for example, the hypervisor of the first partition checks the progress of the running by the mirror virtual machine. If too high a deviation is noticed, that is higher than 50 ms in the example, then the hypervisor of the first partition temporizes before finalizing the context change, that is before enabling the virtual machine of the first partition to continue its running.

So as to ensure a time interval, it is ensured that at least one context change is made at the desired frequency. In our example, a hardware interruption is forced every 50 ms. Such an interruption causes a context change, which guarantees that the device for preventing too high a deviation between the mirror runnings are actually implemented.

When a failure in a module of a running partition is detected, a step 2300 of transmitting a catastrophic error signal to the monitoring partition C occurs. There are two cases depending on whether the failure happens in:

the primary running partition A (FIG. 2 2310), in which case a step of changeover 2400 is operated, the secondary running partition B becoming the new primary running partition, and then there is a step 2500 of continuing the running;

the secondary running partition B (FIG. 2 2320), in which case the step 2500 of continuing the running is directly performed.

This method according to an embodiment of the invention enables the resilience of a high availability device to be increased. A high availability device enabling the implementation of an embodiment of the invention is described hereinafter.

A hardware architecture for implementing an embodiment of the invention is for example a system including eight modules, each of the modules being connected to all the others, this is called a "all-to-all" typology. Other topologies can be employed provided that they offer several paths between the different modules. This number of modules is given by way of example and can vary from two to several tens.

Each interconnection port of each of the modules thus has to support seven high rate links, each link including eight two-way channels. If each link operates at 14 Gb/s, the bandwidth between any two modules of the system is equal to 14×8=112 Gb/s. This frequency is given by way of example and can vary within noticeable proportions, up to the technological limits imposed by the connectors and cables.

Each module supports two sockets locally connected by a high rate bus tracked on their motherboard. This arrangement enables a module for supporting some socket or memory failures to be dynamically reconfigured. It will be noted for what follows that the types of the previous failures are rarely abrupt failures, as for example the power supply failures, and are preceded during a long enough period of time by the rise of error signals which indicate that the reliability of at least one hardware component is degrading. A suitable management of these error signals is desirable to achieve a good performance in terms of resilience. These bi-socket boards are equipped with high rate connectors at the interface with the interconnection module and all the electrical circuits connected to these connectors are capable of supporting hot plugging operations. This implies that the insertion or de-insertion of a module in the cluster is performed without disturbing the operation of the other modules of this cluster. In particular, the connection of a non-powered module to the cables of the interconnection module must not disturb the different switches, which operate on the seven other bi-socket boards. Furthermore, each bi-socket board supports an onboard microcontroller, called BMC (Baseboard Management Controller), enabling very low level functions of the server, such as power on/power off, temperatures and voltages monitoring or even the dynamic reconfiguration of the module-cluster, to be managed.

Reconfiguration Interface

To assist the automatic configuration reconfiguration of the multi-modular system, an Ethernet switch, called MSM (Management Switch Module) having eight ports is incorporated to the interconnection module. This switch can consist of two five-port switches, four downlinks and one uplink, the ports of the uplinks being connected by a printed circuit track. This embodiment further improves the resilience of the interconnection module by restricting the number of cases where the BMCs loss the entirety of their dialog means.

In association with this private Ethernet network to the BMCs, a subsidiary device of the interconnection module enables an identifier to be allocated to each BMC, from which identifier it will be able to calculate its IP address. Indeed, each BMC should be able to start its IP connection on this network with an address different from that of its neighbours. This subsidiary device based on a small FPGA allows to transmit to each BMC, upon initializing, a port number (3 bits identifier) specific to each physical location of the module relative to the interconnection module. From these 3 bits, each BMC completes its IP address before connecting to its neighbours. It will be noted that since the subnetwork between the BMCs and the MSM switch is entirely private, the 29 most significant digits of the IP address can be identical for each module.

To ensure a good resilience towards electrical power supply failures, each module embeds at least two AC-DC converters, also called PSU "Power Supply Unit", delivering the power on the rail, generally under 12V, at the input of each bi-socket board. The PSUs can be connected to two independent AC networks to guarantee the operation of the system if one of these networks is failing. Likewise, the MSM module is powered by several severs: each module turned ON sends through its Ethernet-MSM link a current under 12V. These different currents are summed by a diode switch located between the 12V inputs and the POL of the circuits of the Ethernet switch and the reconfiguration FPGA.

Synchronization Interface

Another constituent element of an embodiment of the invention is a network of synchronization clocks. A subnetwork of the interconnection module all-to-all connects all the FPGAs of all the modules to make up a nearly perfect synchronization system between the processors of the different modules. The logic of the FPGAs enables, upon initializing or reconfiguring, the network of clocks to be partitioned in as much clock subnetwork as there are logic partitions. In each clock subnetworks, the master processor, in general the processor which contains the starting logic, distributes its clock to all the processors belonging to its partition. The FPGA isolates each logic partition such that a partition receives one and only one clock. This clock is a square-wave signal, the frequency of which is a few megahertz, for example 25 MHz. This signal can be beneficially filtered by a PLL circuit at the input of each module to remove any phase noise which could have been introduced by the cables of the interconnection module. Upon restarting, each module starts a counter driven by the clock of its partition. Since this clock is common to the processors of the partition, each of the processors has a synchronous time reference enabling it to time stamp any event which occurred in its module and at any time, it will be possible to reconstitute the timing of several events without ambiguity about their respective order.

An exemplary application is that of the management of catastrophic error signals CATERR, for "Catastrophic Error", which are part of the out-of-band interface of the calculation modules. This is a network which is not used for calculation tasks but only for the module administration. These communications therefore have no impact on the module performances. These signals are distributed in the partitions in the same way as the previously described clock. When a CATERR signal is triggered in a module, it causes generally very quickly, within some microseconds or less, a similar event in one or more of the adjacent modules. Time stamping of the CATERR events in each module enables the BMCs to exchange these measurements and to retrieve what is the source of the problem and thus facilitates the diagnostic and accurate location of the failing module by the BMCs.

Remarks on the Infrastructure

The infrastructure is defined by all the hardware components which provide physical links between the modules. To guarantee the reliability of this infrastructure, it is beneficial to use a maximum of passive components, for which the mean time between failures, MTBF, exceeds by several orders of magnitude the MTBF of the motherboards of the modules. Thus, the number of failures created by this infrastructure can be neglected in assessing the availability of the system. In the system being described, the infrastructure is comprised of an interconnection module, also called backplane, which distributes the interfaces of the high rate links, also called XQPI interfaces, between the eight modules, and the local and out-of-band Ethernet interfaces between the eight modules and the MSM switch.

Since the backplane has to support very high rate signals, 14 Gb/s today, even more in a few years'time, a conventional printed circuit implementation has not been retained. Indeed, even using high-gravity materials, such as for example Megtron6 from Panasonic company, the insertion losses exceed 20 dB at this data frequency for the links between the modules being the most physically remote from each other. Another drawback of the backplane relates to the mechanical reliability. Given the weight of a solid module and the manufacturing tolerances of a frame and its guide elements in the cabinet, the mechanical rigidity of such a backplane exerts very high mechanical stresses on the high rate connectors of the XQPI interface. These stresses are a source of mechanical failure of the infrastructure.

To avoid this problem, the backplane of the multi-modular system of an embodiment of the invention uses links on copper cables ended by float mounting connector assemblies which tolerate up to 1 mm of mechanical misalignment in x and y without exerting a stress on the high rate contacts. Besides, the insertion losses per unit length are about ten times lower than in the conventional PCB material and the number of connectors and vias is reduced to the absolute minimum. These elements are involved in the improvement of the infrastructure reliability and thus in the high availability purpose of the system.

The floating aspect is obtained for example by the use of guides.

FIG. 3 shows that a calculation module 3010 includes a rectangular rigid bottom plate 3020 to which components of this module are attached, which includes a module male or female connector 3040 able to be connected to a frame female or male connector 3050 of a frame 3030 including the backplane or the backplane bus. The frame 3030 is only partially represented herein to illustrate the embodiment. It is clear to those skilled in the art that if the module includes a male connector, then the frame includes a female connector and vice versa.

In one alternative, the bottom plate 3020 is an edge of a printed circuit board.

FIG. 3, which only shows part of the bottom plate of the module, shows that the bottom plate includes, on the side facing the frame connector:
 a first guide 3060 and a second guide 3070 located on either side of the module connector 3040. This placement of the guides enables the connector to be at least mechanically protected. The first guide and the second guide of a first type have substantially the same length and are:
- cylindrical shaped,
- attached to the bottom plate,
- cone-ended on their free side,
- of a length of few centimeters, at least 1 but less than 5.

a third guide 3080 of a second type which is:
- of the same shape as the first guide,
- substantially longer than the first guide, in the order of one centimeter, for example 1 centimeter,
- located on the major centre axis of the rectangle formed by the bottom plate and at a few centimeters from the first and second guides.

FIG. 3 also shows that the frame 3030 includes holes corresponding to the first, second, and third guides.

In a non-represented way, the bottom plate includes at least one fourth guide such as the third guide. This fourth guide is symmetrical to the third one with respect to the minor axis of the rectangle formed by the bottom plate.

A major axis of a rectangle is a perpendicular bisector of a minor side. A minor axis of a rectangle is a perpendicular bisector of a major side.

In an alternative, the first and second guides also have their symmetrical elements with respect to the minor axis, in that case, the bottom plate includes six guides. These axes are axes of geometrical symmetry of the bottom plate. Generally, these axes also correspond to axes of symmetry of masses, that is axes on either side of which the mass of the device is equally distributed. If no, axes of masses can also be used to distribute the guides.

It is clear that the frame includes as many holes able to cooperate with guides as the bottom plate includes guides.

This guide arrangement enables a first positioning, or initial guiding, of the module to be made relative to the frame using the third guide and its symmetrical element, which provides for a first guiding level. This first level is a placement relative to the frame. Then, by continuing the insertion, finally the first and second guides and their symmetrical elements are used, which provides a second, final guiding, while protecting the connectors.

In an alternative of the invention, the guides are rigidly attached to the bottom plate.

This allows to say that there is a floating device because the conical terminations of the guides allow some clearance.

This floating aspect enables a module to be swapped in an improved manner while the frame is being operated. This floating aspect also minimizes the deterioration risks upon inserting a module the weight of which is higher than a tens of kilograms and which can be located two meters away from the ground or level with the ground in a cabinet.

This floating aspect, independently of a hot swap which it makes reliable, also enables an off operating installation to be made reliable by minimizing deterioration risks upon inserting modules. Thus, this floating aspect improves the replacement of a failing module after the running of the applications has been delegated, according to an embodiment of the invention, to another partition. But this floating aspect is also interesting out of the context of application mirroring, for a simple installation.

In another alternative of the invention, the first guide 3060 and the third guide are floatingly attached to the bottom plate. For example, FIG. 4 shows that the bottom plate 3020 includes, on its face opposite to the third guide, two parts perpendicular to the bottom plate:
- a first connector supporting part 4010
- a second connector supporting part 4020.

The first connector supporting part and the second connector supporting part are parallel and include at least one hole 4015 enabling a shoulder bolt to be passed therethrough. The diameter of the at least one hole 4015 of a connector support is slightly higher than the diameter of a shoulder 4035 of a shoulder bolt 4030 used through the hole. Thus, one it is attached, the bolt is loosely fitted in the hole thanks to the diameter difference between the shoulder and the hole. This diameter difference is in the range from 1 to 2 mm.

Figure 4:
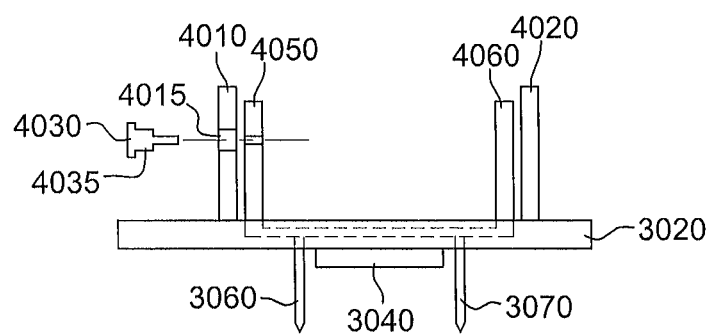
in FIG. 4, an illustration of a connector block with a float on the module side.

FIG. 4 also shows a connector block 4040 able to be slid between the connector supports. The connector block includes a base on which the following are attached:
- the first guide 3060,
- the second guide 3070,
- the module connector 3040.

The connector block also includes a first wall 4050 and a second parallel wall 4060 and such that once the connector block is in place, the walls are parallel to the support parts.

FIG. 4 also shows that a wall of the connector block includes a threaded hole to obtain a thread compatible with that of the shoulder bolt 4030. Once the shoulder bolt is screwed, the connector block is floating towards the bottom plate. This alternative further improves the floating aspect. This flotation depends on the diameter difference between the hole and the shoulder.

In an implementation, each supporting part includes 4 holes for 4 shoulder bolts. The walls then include the 4 corresponding threaded holes. The 4 holes are distributed in a square.

In an implementation, each supporting part includes 3 holes for 3 shoulder bolts. In this case, the walls include the 3 corresponding threaded holes. The 3 holes are distributed into an isosceles or equilateral triangle.

In an implementation, each supporting part includes 2 holes for 2 shoulder bolts. In this case, the walls include the 2 corresponding threaded holes.

Figure 5:
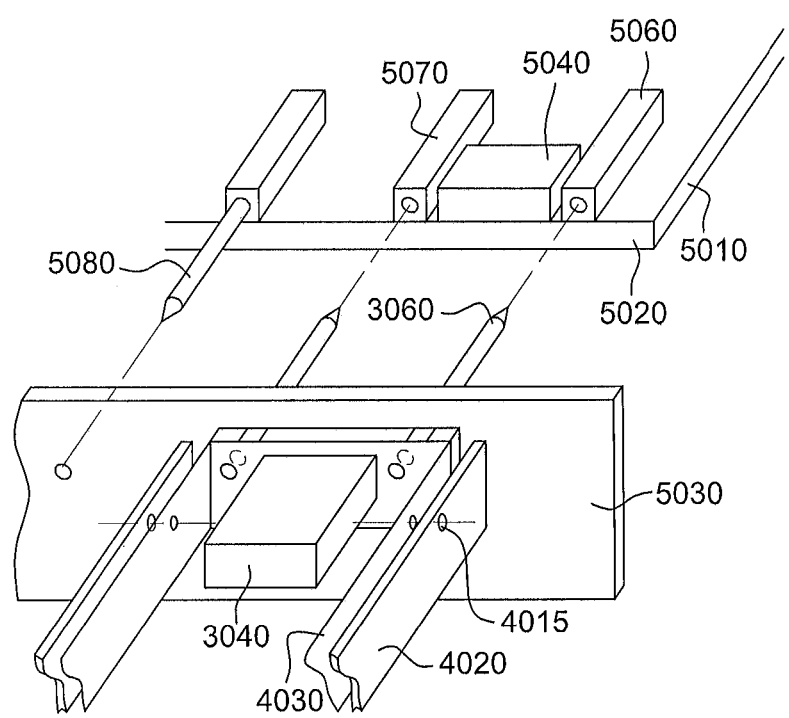
in FIG. 5, an illustration of an implementation of an embodiment of the invention with a float on the frame side.

FIG. 5, being another alternative of an embodiment of the invention, shows a module 5010 which is herein assimilable to a motherboard 5010. The bottom plate 5020 of the motherboard 5010 is an edge 5020 of the motherboard 5010.

FIG. 5 shows that the bottom plate 5020 of the board 5010 includes a connector 5040 and on each side of this connector 5040, the following are found:
- a first guide part 5060 which is in the form of a cylindrical shaped recessed parallelepiped rectangle, the axis of the cylinder being perpendicular to the bottom plate 5020 of the motherboard 501;
- a second guide part 5070 identical to the first guide part.

In an alternative, the aperture of the cylinder on the bottom plate side has a truncated aperture enabling a cylindrical guide to be introduced in an improved manner.

FIG. 5 also shows that the bottom plate of the motherboard includes a guide 5080 similar to the guide 3080 of the bottom plate of the module.

FIG. 5 also shows a frame 5030 on which a connector block such as the one described in FIG. 4 is attached. For FIG. 5, references identical to that of FIG. 4 have been preserved for identical functions.

Thus, the frame 5030 includes, on its face opposite to that facing the motherboard, two parts perpendicular to the motherboard, once the motherboard is in place:
- a first connector supporting part 4010
- a second connector supporting part 4020.

The first connector supporting part and the second connector supporting part are parallel and include at least one hole 4015 enabling a shoulder bolt to be passed therethrough. The diameter of the at least one hole 4015 of a connector support is slightly higher than the diameter of a shoulder 4035 of a shoulder bolt 4030 used through the hole. Once it is attached, the bolt is loosely fitted within the hole thanks to the diameter difference between the shoulder and the hole. This diameter difference is in the range from 1 to 2 mm.

Thus provided, the frame is therefore able to receive a connector block which will thereby be floating.

FIGS. 3 to 5 illustrate several embodiments for a floating connection between a module and a frame.

The MSM switch of an embodiment of the invention, which includes some active elements, is part of the infrastructure. It has been seen previously that its power supplies are strongly redundant. Further, the very low dissipated power, in the order of 2 to 3 watts, and the low number of components enable an MTBF of several millions hours to be predicted for the MSM module. Finally, it will be appreciated that the operation of a MSM switch is monitored by the eight BMCs of the modules and that, if a failure of the MSM is detected, the hot swap of this module does not interrupt the operation of the multi-modular system. It can be said that the impact of the MSM on the availability rate of the system is still negligible, as long as the physical swap of the module takes place within the usual deadlines.

The description of the different software components used by an embodiment of the invention will now be discussed.

Octo-Module Configuration

It is considered that the eight-module configuration described above is intended to support a 1+1 redundancy system, where each processor of a partition has a redundant processor in another partition. This configuration is the simplest to describe but for, the sake of security, a 1+2 or 1+3 redundancy configuration, where each processor of a partition has respectively two or three redundant processors in respectively two or three other partitions, can be used.

During a step of configuring (E1) of the plurality of modules into a plurality of partitions, three modules are ascribed to a partition A, a foreground partition. Consequently, a partition B, being a background partition, is also made up with three modules. The two remaining modules of the eight-module configuration are affected to a partition C, a monitoring partition, one of the modules of which supports the running logs of the partitions A and B. The second module of the partition C can temporarily replace any other failing module, depending on the availability rate demanded.

The partition C can optionally run non-critical applications, with the proviso that the priorities of these applications are defined much below priorities of the software modules which ensure the high availability functions for the applications run in the partitions A and B.

The load of the critical applications represents in this case 37.5% of the processing power installed, that is three modules on a total of height.

For a quadri-module configuration, the partition A and the partition B each contain a single module and the partition C contains two of them. In this case, the load of the critical applications only represents 25% of the processing power installed.

Operating the Architecture

An embodiment of the invention only uses OSs operating on a single core. Indeed, even though cores of OSs running on multicore processors are able to be made, the implementation of such cores in this invention can cause insoluble problems of the process synchronization. This does not mean that the physical processor is a single core processor. The use of multicore processors is only constrained by the allocation of physical resources ensured by the hypervision layer, according to which a given OS only receives one and only one core. On the other hand, nothing prevents the same core to be ascribed to several distinct OSs. In the later case, only the performance or the response time can be affected. In the following description, the simple rule is assumed: 1 core=1 OS. It will be appreciated that, under each OS, the users are free to run as many simultaneous applications as they want. The calculation load which is generated by these applications is conventionally multiplexed by the scheduler of the core of the OS. The higher the load, the lower the performances.

To ensure scheduling of the processes, each OS generates a queue of processes ready. Only the first process of this queue receives the processor and thus is in a so-called running sub-state. When the process running meets a blocking-type synchronization semaphore, called P-Op, it leaves the queue of the processes ready and switches to a waiting state until another process or an input-output interrupt manager comes to deblock it by a V-Op type operation on the same semaphore. At this time, the process is once again inserted in the queue of the processes ready depending on priority rules which depend on the OS and its configuration. It is hypothesized here that there is a queuing in a so-called "insertion priority" mode. This point means that the queue in question is made up of several sub-lists, one sub-list per priority level, the sub-lists being chained and classified among themselves as a function of their priority. The insertion by priority means that the new element is inserted at the end of the sub-list associated with the priority of this new element. If this sub-list does not exist, the new input is inserted at the end of the first sub-list present and having the highest priority, or at the top of the list if the sub-list in question does not exist. This operation type regularly performed by the core is also called a dispatching operation or dispatch in an abbreviated form.

With such a synchronization core of the processes, which core has become conventional today, running on a core consists of a succession of series of instructions separated by dispatching operations run by the module, single in the OS, for synchronizing the processes. If two identical OSs, running the same processes (same codes, same data, on identical processors) are run in parallel by being synchronized at the time of dispatching operations, the states of both OSs and accordingly the results obtained at the output of both OSs are rigorously identical from the logic point of view. However, running from the physical point of view can differ from running from the logic point of view.

Running from the Physical Point of View

In the following, the way the schedulers of two cores running in parallel on the partition A and on the partition B can remain in a perfect synchronization is described.

When a program is run on a conventional computer, the logic, in the mathematical sense of the word, of this program has to be run in a deterministic way. This means that the programmer expects that two successive runnings of the same program on the same data set always lead to exactly the same results. In reality, it is only a facade because in the background, between two logic runnings, various events can come to be interlaced in the middle of the program and completely modify its running timing. The main events that can occur are: interruptions, dispatches allocating the processor to another task, or "thread", following a V-Op waking-up a thread having a higher priority, errors recoverable upon reading the central memory or during the data transfer on the input-output buses. This list is not comprehensive. In any case, it can be said that management operations (scheduling, errors, etc.) are invisible to the program considered, except as regards its timing. It is thus the running timing that introduces the running notion from the physical point of view of the program by adding the finest time component of the description. If no care is taken, starting several programs in parallel under an OS guarantees in no way the order in which the operations will be performed. Accordingly, there can be quickly a very great time offset between a program running on the partition A and the same program running on the partition B, even if they have been started on the same clock start time. The present invention shows that the suitable organization of the synchronization points of the threads in a multi-modular system allows to guarantee that the physical runnings between two partitions can remain synchronous within a time interval determined beforehand, for example 50 ms. Since the interruptions can generally be followed by starting a thread, and since this starting is performed through the dispatcher of the OS core, it is possible to bound the desynchronization between the partitions A and B by artificially introducing interruptions generated by a timer hardware. This timer is generally available from the chipset resources and the hypervisor can initialize it to create a dispatch at a given frequency, for example 20 Hz if it is desired that the desynchronization does not exceed 50 ms. It should be reminded that on a modern processor, the context change time in the order of 1 µs. Thanks to this characteristic, forcing a dispatch every 50 ms has no visible effect on the performances. It would be completely different if the threads were intended to be synchronized within 5 or 10 µs.

Synchronization Between 2 VM

To distinguish the case of the VMs which run in the same partition A or B and that of two VMs one of which runs on A and the other on B, the later situation is called "non-coherent VMs" to remind that the memories of A and B are not coherent for the purpose of the XQPI inter-module interface.

In order to better understand the benefits provided by embodiments of the invention, it is interesting to focus on some cases of abrupt failures and the associated reactions of the system according to the invention.

The VRM "Voltage Regulator Module" converters are the POL converters of the processors or DRAM memories. When such a VRM fails, the associated circuits stop their activity after a few microseconds because voltage presence detector, at least, makes the PWRGOOD signal to change over, which causes the logic hang-up and the rise of the CATERR signal. The CATERR signal is transmitted by the interconnection module to all the modules of the partition. In reception, CATERR blocks all the connected processors and the maintenance processor, BMC, starts procedures to manage the failure.

The hang-up of all the transactions with the synchronization functions is detected within 50 ms. The partition B ends running its threads up to this synchronization point. Then, since the failure of the partition A is noticed by the synchronization function, the latter releases the threads of the partition B by simulating a V-Op which enables these threads to continue their running.

A fatal error in memory is a quite frequent error type because the number of transistors which make up the central memory can exceed that of the processors and caches by two orders of magnitude. In the Intel terminology, the management architecture of these errors is called MCA (Machine Check Architecture). An error is of the so-called hard type if a memory cell is definitely attached to a 0 or a 1. An error is of the so-called soft type if the content of the cell has been altered but the operation of this cell remains acquired.

In the MCA architecture, a fatal error in memory results without alternative to a "crashdump" memory, of the OS or the hypervisor. The reboot is thus necessarily very long, generally of several minutes.

By the use of an embodiment of the invention, the crashdump function is preceded by the changeover function which ensures within 50 ms the changeover between the partition A and the partition B.

Since a great number of fatal errors in memory are not hard type errors but soft type errors following a running changeover, it is possible to reboot the partition A, and then to gradually migrate the OSs and applications from the partition B to the partition A, until the synchronization functions of the partition C are actually able to be reactivated. Once at this stage, the system has become redundant in 1+1 again and since it is fully symmetrical, it is not essential to changeover the partition A into the primary mode again. It is sufficient to state that the partition B has become the primary partition and that the partition A has become the mirror partition.

Since the bandwidth of the XQPI bus is significant, more than 10 Go/s with the current technologies, migrating a central memory by 1 To will take mechanically at least 1,000 G/10 G=100 seconds. This transfer is beneficially driven by a software module residing in the partition C. It is the order of magnitude of the time during which the system will not be fully redundant, but it will have ensured the service resumption within 50 ms. The critical failure rate is then related to the probability of a second fatal error during this 100 s interval. For example, by assuming a technology leading to a fatal error rate of 1 per $10^{18}$ read bits and a memory read with a rate of 1,000 Gb/s, the system would have a mean interval between two failures in the order of $10^6$s, that is nearly 300 hours. In reality, one should be careful with this type of statistics because the memory reading process does not have the stationary state characteristics of the conventional random variables. The fatal memory errors can be totally due to a single failing cell which would be assessed very frequently by an OS or a particular application. Given this, with the above hypotheses and in view that, on average, a fatal error occurs every $10^6$s, the critical failure rate of the system is given by the probability of occurrence of a second fatal error in 100 s, that is 1/10,000. And the MTBF would be in the order of 3 M hours, or 340 years. If this failure rate is deemed to be too high, it will be necessary to switch to a redundancy scheme in 1+2 or 1+3, that is to keep more than two machines synchronized.

A fatal error at the input-output of a disk is also a quite frequent type of error because the causes of error on the storage devices are very numerous.

The storage subsystem of the system according to an embodiment of the invention is assumed to be in RAID1 mode, which means that any file written on a disk attached to the partition A has a mirror file on a disk attached to the partition B.

A fatal error in this field can be due to a disk block the content of which has been incoherently overwritten by any failure. The error is detected by a wrong error correcting code upon reading this block and this error is reported to the input-output manager by the messages of the PCIe bus corresponding to the channel of the failing disk.

In this case, the entire file is inaccessible to the program which attempts to have inputs-outputs on this disk and generally the OS ends the application by switching it to a hung-up state. Since the mirror program has not directly received the error notification because it is run in the partition B, the synchronization function is able to start the file recovery after having for a while, handed it on to the mirror program by simulating the synchronization V-Ops.

Algorithms enabling this hot resumption are known and used in all the RAID controllers in the market. Here, the firmware functions of the RAID controllers are replaced by one or more software functions which are run in the partition C. These functions implement logs of events which ensure the integrity of the file systems.

A benefit of an embodiment of the invention is once again to be able to guarantee that the program resumes its normal activity within 50 ms.

Having described and illustrated the principles of the invention with reference to various embodiments, it will be recognized that the various embodiments can be modified in arrangement and detail without departing from such principles. It should be understood that the devices, modules, processors, processing units, programs, processes, or methods described herein described herein are not related or limited to any particular type of computing environment, unless indicated otherwise. Various types of specialized computing environments may be used with or perform operations in accordance with the teachings described herein. Elements of embodiments shown in software may be implemented in hardware and vice versa.

Execution of the sequences of machine instructions contained in the memory causes the processor or processing unit to perform at least some of the process steps, calculations or function(s) of the procedures described herein. One or more physical processors or physical processing units in a multi-processing arrangement may also be employed to execute the sequences of instructions contained in the memory or machine/computer readable medium. In alternative embodiments, hard-wired circuitry may be used in place of or in combination with software instructions.

The term "computer readable medium" or "machine readable medium" as used herein refers to any medium that participates in providing instructions to a processor or processing unit for execution. Such a medium is non-transitory and may take many forms, including but not limited to, non-volatile media, volatile media, and transmission media. Non-volatile media include, for example, optical or magnetic disks. Volatile media include dynamic memory. Transmission media include coaxial cables, copper wire and fiber optics. Common forms of computer/machine readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer/machine readable media may be involved in carrying one or more sequences of one or more instructions to processor for execution.

Computer programs comprising machine executable instructions for implementing at least one of the steps of the method described herein or function(s) of various elements of the structural arrangement can be implemented by one or more computers comprising at least an interface, a physical processor and a non-transitory memory (also broadly referred to as a non-transitory machine readable or storage medium). The computer is a special purpose computer as it is programmed to perform specific steps of the method(s) described above. The non-transitory memory is encoded or programmed with specific code instructions for carrying out the above method(s) and its/their associated steps. The non-transitory memory may be arranged in communication with the physical processor so that the physical processor, in use, reads and executes the specific code instructions embedded in the non-transitory memory. The interface of the special purpose computer may be arranged in communication with the physical processor and receives input parameters that are processed by the physical processor.

It will be appreciated by one skilled in the art that the disclosed arrangements and methods described herein represent a solution to the technological problem currently faced by designers for improving the environment resilience of systems.

The invention claimed is:

1. A method for synchronously running an application in a high availability environment including a plurality of calculating modules interconnected by a very high-speed broad band network, the method comprising:
   configuring the plurality of calculating modules into a plurality of partitions including at least:
      two running partitions including nodes identical in number and in characteristics, a primary running partition and a secondary running partition;
      a monitoring partition including at least one module;
   running the application on each running partition, inputs-outputs processed by the primary partition being transmitted to the secondary running partition via the monitoring partition which logs the inputs-outputs as transactions distributed between the primary running partition and the secondary running partition,
   synchronizing executions on the primary partition and on the secondary partition by numbering microprocessor context changes, a time deviation corresponding to a difference between a current context numbers, on the primary and secondary running partitions, having to be lower than a given value;
   transmitting an error signal to the monitoring partition, said signal being characteristic of a failure in a module of a running partition;
   continuing the running by switching to a degraded mode, the running continuing on a single partition, and in the case of a failure of a module of the primary running partition, performing a changeover operation, the secondary running partition becoming the new primary running partition.

2. The synchronous running method according to claim 1, wherein an interruption is forced at a predetermined frequency, to force a microprocessor context change and thus perform a synchronization.

3. The method according to claim 2, wherein the predetermined frequency is in the order of 20 Hz, the desynchronization being thus bounded at 50 ms.

4. The method according to claim 1, wherein the application is virtualized via a hypervisor.

5. The method according to claim 4, wherein the virtual machines are identical on the primary running partition and on the secondary running partition, the virtual machines being run on a single processor core.

6. The method according to claim 1, wherein configuring the plurality of modules into a plurality of partitions is dynamically performed, without a service hang-up of the environment.

7. The method according to claim 1, wherein the apparent unavailability of the environment is equal to the desynchronization between the running of the application on the primary and secondary partitions, the unavailability being thus bounded by the synchronization of the executions.

8. A device implementing the method according to claim 1.

9. A digital storage device including a file corresponding to instruction codes implementing the method according to claim 1.

10. The device according to claim 9 including the plurality of modules inserted in a frame, wherein a bottom plate of a module includes insertion guides attached to the bottom plate, the guides being of two types:
- a first type, to ensure a final guiding and protection of a connector of the bottom plate,
- a second type having a cone-ended cylindrical shape to ensure an initial guiding,
- each guide having a corresponding device in the frame.

11. The device according to claim 10, wherein at least one guide of the second type is rigidly attached to the bottom plate.

12. The device according to claim 10, wherein the bottom plate includes four guides of the first type and two guides of the second type.

13. The device according to claim 10, wherein the guides are symmetrically distributed with respect to axes of symmetry of the bottom plate.

14. The device according to claim 10, wherein the first type has a cone-ended cylindrical shape, its length being lower than that of the second type in the order of one centimeter.

15. The device according to claim 14, wherein at least one guide of the first type is loosely attached to the bottom plate.

16. The device according to claim 10, wherein the first type is a recessed part able to cooperate with a cone-ended cylindrical shape.

17. The device according to claim 16, wherein at least one cylindrical guide cooperating with the guide of the first type is loosely attached to the frame.

* * * * *